United States Patent [19]

Joschko et al.

[11] 3,848,876

[45] Nov. 19, 1974

[54] SCANNING ELEMENT

[75] Inventors: Günter Joschko; Hans-Jürgen Winter, both of Berlin, Germany

[73] Assignee: Ted Bidplatten Aktiengesellschaft AEG-Telefunken, TELDEC, Zug, Switzerland

[22] Filed: Sept. 29, 1972

[21] Appl. No.: 293,514

[30] Foreign Application Priority Data

| | | |
|---|---|---|
| Sept. 30, 1971 | Germany | 2149439 |
| Sept. 30, 1971 | Germany | 7137567 |

[52] U.S. Cl. .......... 274/38
[51] Int. Cl. .......... G11b 3/46
[58] Field of Search .......... 274/38; 125/11 N, 30, 39

[56] References Cited

UNITED STATES PATENTS

| | | | |
|---|---|---|---|
| 2,890,694 | 6/1959 | Miller | 125/39 |
| 3,138,875 | 6/1964 | Christensen | 33/18 R |

FOREIGN PATENTS OR APPLICATIONS

| | | | |
|---|---|---|---|
| 556,716 | 10/1943 | Great Britain | 125/39 |
| 234,353 | 6/1961 | Australia | 125/39 |

*Primary Examiner*—Louis R. Prince
*Assistant Examiner*—Charles E. Phillips
*Attorney, Agent, or Firm*—Spencer & Kaye

[57] ABSTRACT

A stylus for scanning signal-storing undulations on the surface of a carrier, which stylus includes a diamond whose tracing portion lies at the intersection of at least two natural crystal faces.

17 Claims, 3 Drawing Figures

FIG. 1
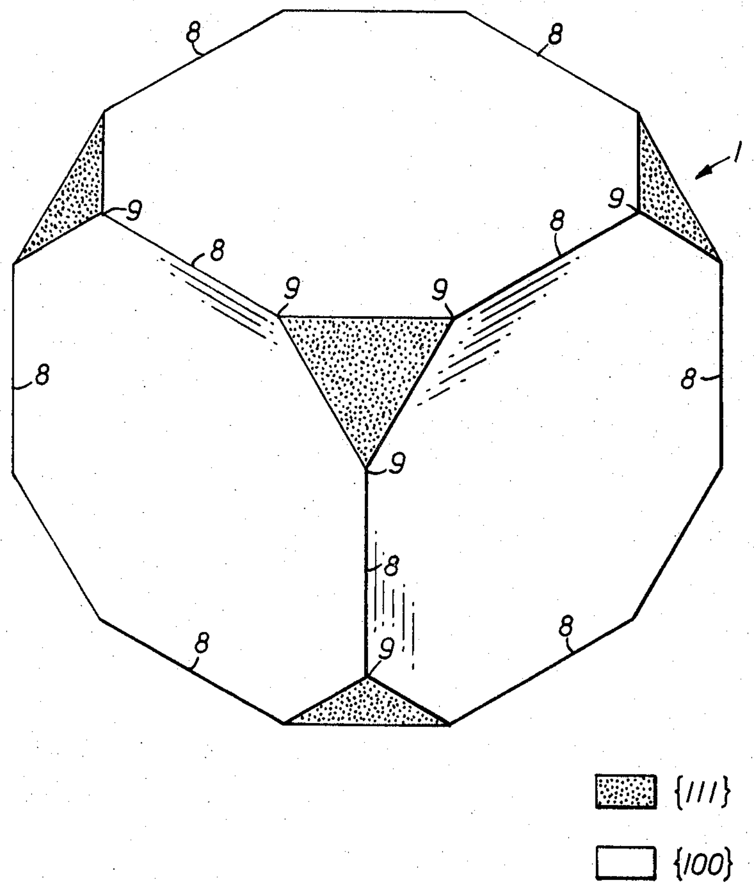
FIG. 2
FIG. 2a
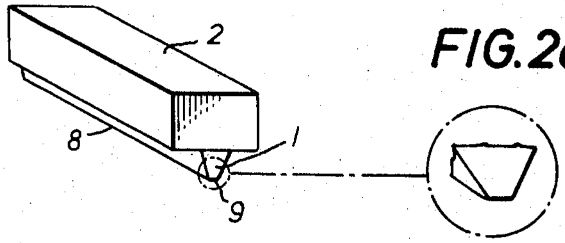

SCANNING ELEMENT

BACKGROUND OF THE INVENTION

The present invention relates to a scanning element for scanning a carrier on whose surface signals are stored in the form of surface undulations. The scanning element of the present invention is particularly useful as a component for the pressure tracing of video signals.

Due to their small size, the scanning element of pressure tracers may be referred to as tips or styluses. As in the case of phonograph record scanning elements, pressure tracing scanning elements are made of a wear-resistant material such as sapphire or diamond.

It is known that a phonograph-record-like information carrier can be provided with a signal in the form of three-dimensional undulations of the surface of a groove with such quality that it is possible to store, and then mechanically read out, not only sound oscillations with an upper frequency limit of about 20,000 hertz but also, using pressure tracing, far higher frequency signal oscillations up into the range of several megahertz. However, then the conventional phonograph tracing using a mechanical-electrical converter for sensing the movement of a scanning stylus cannot be used. Rather, a pressure scanner is used, which lies, with a tracing portion preferably resembling the upwardly curving, front portion of an ice-skating blade, in the signal groove and spans preferably a plurality of wavelengths of the undulations of the groove surface while contacting at the same time a corresponding number of peaks of the relief representing the signal. A pressure tracing is, however, also possible when the scanning element is so short in the direction of its velocity relative to the information carrier that it is only in contact with a part of one undulation on the groove surface. If the scanning element is in contact with a plurality of peaks of the relief, then it possesses a sharply retreating, trailing edge, and, with each emergence of a peak of the relief out of the region of contact with the tracing portion of the scanning element, there occurs an abrupt release of pressure on the scanning element. This abrupt pressure release is registered by a mechanical-electrical transducer attached to the scanning element and converted to an electrical output.

Reference is made to the following two publications for further details on the essential concepts of pressure tracing for the playback of television programs stored on phonograph-record-like discs:

1. "Video Disks Look Good for TV Playback," Electronics, Aug. 3, 1970, pages 127 and 128;

2. "A Mechanical Disc Recording and Reproducing System With High Storage Density and High Rate of Transmission," Journal of the Audio Engineering Society, Volume 18, No. 6 (December, 1970), pages 618 to 623.

During pressure tracing, the surface relief representing the signal on the information carrier undergoes an elastic compression due to the bearing pressure exerted by the tracing portion of the scanning element. The size of the compressive deflection which the surface relief undergoes is larger than any similarly directed movements undergone by the scanning element — because the inertia of the scanning element holds it almost perfectly steady.

In storing and playing back signal oscillations in the megahertz range, the information carrier must run with a high velocity. In the case of video signals and a rotating information carrier, for example, the speed must be 25 rotations per second. It has been found that available information carriers can undergo a high number of repetitions of the playback process without quality loss, but that the scanning element, although made of a wear-resistant material (for example, diamond) shows evidence of being worn down after a certain length of time and must be replaced. The regrinding of scanning elements serving for the playback of stored signals, for example the diamond styluses used for sound playback, is to this time not a usual practice and would only be possible on special machines at great expense.

Thus there have been efforts made at attaining the greatest possible wear-resistance in the tracing portions of scanning elements. In producing scanning elements from natural diamonds, considerable machining work has to be done, particularly in the region of the portion which does the actual tracing work in a groove on a carrier of information. This is especially true when the scanning element must be pointed in a certain preferred direction. Thus, it has been discovered that the wear-resistance of diamond is highest in certain directions and that the wear-resistance remains still quite high within certain tolerances from these directions. The greatest hardness lies in the direction [110] and in crystallographically equivalent directions of the crystallographic cubic surfaces in diamond. Still relatively hard is the direction $[\bar{1}\bar{1}2]$ and the crystallographically equivalent directions of the crystallographic octahedral surfaces of the diamond crystal.

Relative to the system of indices as used above to designate directions and as used later to designate surfaces or planes, reference is made to the book, ANORGANISCHE CHEMIE (Inorganic Chemistry), by Walter Hückel, Publisher: Akademische Verlagsgesellschaft Geest and Portig KG, Leipzig C 1, fourth Edition, 1950, page 165. The indices for the planes are referred to as Miller indices. Reference is also made to the book, ELEMENTS OF X-RAY DIFFRACTION, by B. D. Cullity, published by Addison-Wesley, Reading, Massachusetts, 1956, pages 37 to 39 and 48 to 49; and to "AN INTRODUCTION TO CRYSTAL CHEMISTRY," by R. C. Evans, published by Cambridge University Press, Cambridge, 1952, pages 28 and 29.

Concerning the discovery that cerain orientations in a diamond crystal have superior wear-resistance, reference is made to copending U.S. Pat. application No. 202,988, filed Nov. 29, 1971, now U.S. Pat. No. 3,781,020, issued Dec. 25, 1973, by Helmut Batsch et al. for a "Diamond Stylus for Disc Records." The disclosure of that application is incorporated here by reference for the purpose of providing basic exemplary information which may be applied for putting the diamond scanning element of the present invention to use.

Thus, because of the especially large hardness of a diamond crystal in certain directions, it has already been proposed that a scanning element of optimum wear-resistance, preferably a skate-shaped tracing portion, be produced from a raw diamond by appropriate selection of the cutting angle under which the scanning element is to be cut out of the raw diamond. The disadvantage here is, as mentioned above, that considerable machining work is necessary. Furthermore, the crystallographic orientation of a scanning element cut from a raw diamond can no longer be recognized, so that the mounting of the element in the preferred orientation of high hardness becomes difficult and inexact.

SUMMARY OF THE INVENTION

An object of the invention, therefore, is to provide a scanning element for scanning signal-storing undulations on the surface of a carrier, which scanning element has high wear-resistance and a tracing portion of easily recognizable crystallographic orientation.

This as well as other objects which will become apparent in the discussion that follows are achieved, according to the present invention, by a scanning element including a diamond having its tracing portion at the intersection of at least two natural crystal faces.

GENERAL ASPECTS OF THE INVENTION

Thus, according to the present invention, a scanning element is of diamond and has as its tracing portion a natural crystal edge or natural crystal corner. No machining is needed for these crystal edges or corners. The advantage results that the crystallographic orientation of a scanning element according to the invention is always recognizable due to the presence of these natural crystal edges or corners, because natural crystal edges or corners are always located in precise crystallographic orientations in a diamond crystal.

Preferably, the scanning element of the present invention is produced from a diamond of cubic and/or cubo-octahedral form, because such forms are easily recognizable and identifiable. In choosing cubic and/or cubo-octahedral crystals, attention must be paid to getting those whose natural crystal faces are as much as possible undisturbed. Thus, it is desired that the crystals used for the present invention be as close to perfect development as possible. Choice is easiest when selection is limited to crystals which do not show any coarse flaws such as screw dislocations or twin formation. Well developed forms occur especially often in the case of synthetically manufactured diamonds. The natural crystal edges or crystal corners of synthetic diamonds have a natural form which is just the form needed for scanning elements. Consequently, except for a finish grinding, no significant machining of the tracing portion of a scanning element according to the present invention is needed. Furthermore, the use of the natural edges and corners of crystals of determined form assures, because of the angle equality for equivalent surfaces, a high uniformity in the scanning element.

From the use of the word "natural" above even with regard to synthetic diamonds, it will be apparent that "natural" is used herein to designate the faces, edges and corners which result when a diamond crystal grows freely and which are determined by the interactions of the carbon atoms with one another when coalescing to form diamond.

Preferably, a corner formed by the intersection of three natural faces of a crystal is used as a scanning corner. Such a corner can be used either as the stylus tip of a scanning element, where the tip is oriented to be always in contact only with a portion of one peak of the relief in the groove of a carrier, or it can be used as the location on an elongated, skate-shaped tracing portion where there is a sharp retreat of the tracing portion from a contacted carrier. The skate-shaped tracing portion is designed to be in contact with a plurality of peaks in a groove and, because three faces intersect to form a corner, one face would correspond to the sharply retreating face (i.e., face 6 in the above-mentioned copending patent application, now U.S. Pat. No. 3,781,020), while the remaining two intersecting faces would form the elongated part of the tracing portion for contacting simultaneously a plurality of undulation peaks.

In the case of a skate-shaped (i.e., having an elongated lower edge shaped and aligned such as in the case of edge 8 in FIGS. 1 or 2 of the above-mentioned pending patent application) scanning element, the natural crystal edge serving as the skate blade can exhibit a natural chamfer. This is advantageous when using synthetic diamonds, since the natural crystal edges of such diamonds are often chamfered or truncated anyway. For example, there may exist a slight development of the dodecahederal faces, such as can result during the manufacture of synthetic diamonds. Such chamfered edges need almost no subsequent finish grinding, provided that they fit the scanning groove (thus provided, for example, that their breadth is less than 4 microns for a groove breadth of 8 microns.)

Natural crystal edges or naturally occurring chamfers may be rounded off in a finish grinding, in order to assure optimum scanning conditions.

In making synthetic diamonds, nitrogen content may be controlled to keep impact strength high and this has a favorable effect on wear-resistance.

The scanning element diamond is bonded to a transducer body of piezo ceramic, which serves as the actual pressure tranducer. It is conventional to glue the diamond onto the ceramic. However, with heavy loading of the transducer body, the glued location can lead to disturbances. Thus, according to a further development of the invention, such disturbances can be eliminated by vapor-depositing a conductive, metallic (solder) layer onto the diamond after it has been appropriately oriented and fixed. This layer serves as a connecting member for connection of the diamond to the piezo ceramic. The thus-coated diamond is then bedded into a piezo ceramic mass, after which the assembly is sintered, for instance pressure sintered, to form one integral piece. The coated diamond can, however, be provided with the requisite piezoelectric layer also by a vacuum evaporation technique, by cathode sputtering, or by plasma spraying. It is to be noted that the application of these layers can be carried out on natural diamonds as well as synthetic diamonds.

BRIEF DESCRIPTION OF THE DRAWINGS

FIG. 1 is a view of a cubo-octahedral diamond crystal as seen along a perpendicular to the centrally situated, triangular, octahedral surface; a legend is provided for identifying the two planar forms appearing in the figure.

FIG. 2 is a perspective view of a scanning element according to the invention.

FIG. 3 is a detail view of a portion of FIG. 2.

DETAILED DESCRIPTION OF THE PREFERRED EMBODIMENTS

Referring firstly to FIG. 1, there is shown a synthetic diamond single crystal 1 of cubo-octahedral form. The triangular faces, which have been stippled only for the purpose of making them stand out better, are natural octahedral faces. The crystallographic Miller indices for these octahedral surfaces are of the form {111}. The remaining faces shown in FIG. 1 are natural cubic surfaces and are planes of the form {100}. Any edge 8 serves preferably according to the invention as a tracing blade, while corners 9 at the trailing portions of the blades are locations where there is a sharp retreat due to the intersection of the octahedral planes at the points of corners 9. Here, the numbers 8 and 9 correspond to the numbers 8 and 9 as used in the abovementioned copending patent application, now U.S. Pat. No. 3,781,020. It will be evident that, while the diamond of FIG. 1 may be oriented so that an edge 8 serves as a tracing blade (thus contacting several undulation peaks at the same time), contact by a point 9 always with only part of a single peak may be obtained by using a crystal orientation such that the pertinent edge 8 is rotated about the point 9 more upwardly from the information carrier.

FIG. 2 shows a scanning element according to the invention constructed of a synthetic diamond 1, according to FIG. 1, bonded to a piezo ceramic 2. The piezo ceramic serves as a pressure transducer. The tracing portion of the diamond includes a tracing edge 8, which ends abruptly at tracing corner 9.

FIG. 2*a* shows an enlarged, detail view of a corner 9. Corner 9 and edge 8 exhibit a small chamfer in the form of a dodecahedral surface, which truncates the intersection of the cubic faces. The dodecahedral surface is rounded off, due to a finish grinding.

The solder layer may be evaporated in vacuum ($10^{-5}$ Torr) on the diamond using an electron beam for vaporizing the metal to be evaporated, the diamond having a temperature of about 350° C. The layer than may be coated with a piezo electric layer in vacuum by evaporating or sputtering (see for example: Norman F. Forster: "Piezoelectric and Piezoresistive Properties of Films" in Journal of Applied Physics, 40, 420, 1969).

Another method is to sinter piezo ceramic material together with the diamond, which is coated with its solder layer, in the well known manner used for sintering these ceramic material without an accompanying diamond.

Synthetic diamond almost exclusively is containing dispersed nitrogen to an extent of $10^{15}$ to $10^{17}$ atoms/cm$^3$, i.e., from one part in 100 million to one part per million. When dispersed nitrogen is present in a diamond, it has a greenish-yellow colour because the nitrogen atoms absorb a substantial part of the blue component of the white light passing through. These diamonds are recognizable by their electron spin resonance which may be established when using an electron paramagnetic resonance spectrometer (Smith, M. J. A., and Angel, B. R., Phil. Mag. 15, 783 (1967).

Synthetic diamonds of the sizes, which are suitable for the purposes of the invention, i.e., of lengths of about 200 μm or less, can be bought as "Diamant-Sagekörnung SDA" (from 30 to 60 mesh or "Schleifkörnung MDSA-S" or "MDA-S" (from 80 to 120 mesh) (mesh being a dimension used in the United States) at the "Ademant Diamant Gesellschaft," 4 Düsseldorf 1 (W-Germany), Graf-Adolf-Platz 3.

The properties of synthetic and of natural diamonds are well known and described for example in:

1. W. Kaiser, W. L. Bond Phys. Rev. 115, 857 (1959)
2. R. H. Wentorf Jr., H. P. Bovenkerk J. of Chemical Physics Vol. 36, No. 8, Apr. 15, 1962
3. De Beers Diamond Research Laboratory "Im Brennpunkt der Leistung," pages 6 and 7, August 1970
4. "De Beers Diamant-Forschung," pages 5 ff.

F. A. 5. "De Beers Research Serves The Diamond Industry," pages 3 ff. by Dr. F.A. Raal, Research Manager of the De Beers Diamond Research Laboratory 6. B. R. Angel Department of Physics Plymouth College of Technology
7. M. J. A. Smith School of Physics University of Warwick Coventry
8. J. J. Charette Department of Physics University of Lovanium Kishasa - Congo Nature, Vol. 218 June 29, 1968

It will be understood that the above description of the present invention is susceptible to various modifications, changes and adaptations, and the same are intended to be comprehended within the meaning and range of equivalents of the appended claims.

We claim:

1. In a signal scanning means for scanning of signals stored on an information carrier which is moving with a velocity relative to the signal scanning means, the combination of a transducer body, and a scanning element attached to the transducer body for scanning signal-storing undulations on the surface of the information carrier, the scanning element comprising a diamond having natural crystal faces and at its tracing portion a rounded intersection of at least two natural crystal faces and at the intersection a sharply retreating trailing edge.

2. A signal scanning means as claimed in claim 1, said diamond having at its tracing portion a rounded natural crystal edge.

3. A signal scanning means as claimed in claim 1, said diamond having at its tracing portion a rounded natural crystal corner.

4. A signal scanning means as claimed in claim 1, said diamond being a cubic diamond crystal.

5. A signal scanning means as claimed in claim 4, said diamond being synthetic.

6. A signal scanning means as claimed in claim 5, said tracing portion consisting of a corner formed by the intersection of three natural crystal faces of the diamond, said corner being rounded.

7. A signal scanning means as claimed in claim 5, said diamond containing nitrogen in an amount effective for increasing impact resistance.

8. A signal scanning means as claimed in claim 1, said diamond having a face coated with an electrically conductive substance, further comprising a piezoelectric transducer contacting said substance.

9. A signal scanning means as claimed in claim 8, said transducer being sinter-bonded to said substance.

10. A signal scanning means as claimed in claim 1, said diamond being a cubo-octahedral diamond crystal.

11. A signal scanning means as claimed in claim 10, said diamond being synthetic.

12. A signal scanning means as claimed in claim 11, said tracing portion consisting of a corner formed by the intersection of three natural crystal faces of the diamond, said corner being rounded.

13. In a signal scanning means for scanning of signals stored on an information carrier which is moving with a velocity relative to the signal scanning means, the combination of a transducer body, and a scanning element attached to the transducer body for scanning signal-storing undulations on the surface of the information carrier, the scanning element comprising a diamond having natural crystal faces and at its tracing portion a natural crystal edge formed by the intersection of two natural crystal faces, said edge showing a natural chamfer and having at one end a sharply retreating trailing edge.

14. A signal scanning means as claimed in claim 13, said chamfer being a natural dodecahedral crystal face.

15. A signal scanning means as claimed in claim 13, said chamfer being rounded off.

16. A signal scanning means as claimed in claim 13, said diamond being synthetic and containing nitrogen in an amount effective for increasing impact resistance.

17. A signal scanning means as claimed in claim 13, said diamond having a face coated with an electrically conductive substance, further comprising a piezoelectric transducer contacting said substance.

* * * * *

UNITED STATES PATENT OFFICE

CERTIFICATE OF CORRECTION

Patent No. 3,848,876 Dated November 19, 1974

Inventor(s) Gunter Joschko et al.

It is certified that error appears in the above-identified patent and that said Letters Patent are hereby corrected as shown below:

In the heading of the patent, under "[73] Assignee:" change "Ted Bidplatten" to -- TED Bildplatten --.

Column 1, line 11, change "element" to -- elements --.

Column 6, line 7, delete "F. A." .

This certificate supersedes Certificate of Correction issued June 24, 1975.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*

FORM PO-1050 (10-69)

USCOMM-DC 60376-P69
U.S. GOVERNMENT PRINTING OFFICE 869-930